United States Patent Office 2,756,535
Patented July 31, 1956

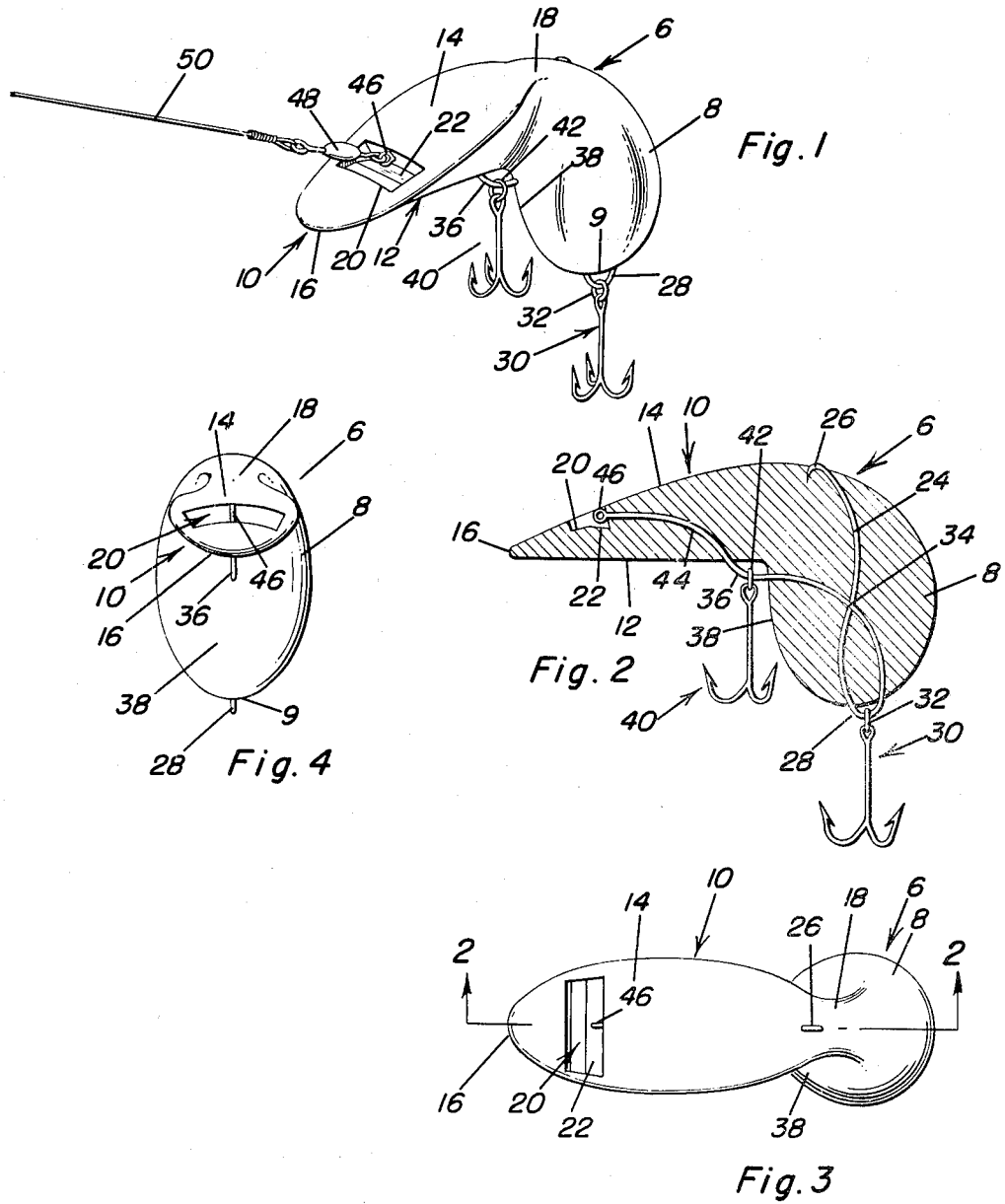

2,756,535

FISHING LURE

Ballard N. Dean, Seattle, Wash.

Application July 27, 1953, Serial No. 370,334

2 Claims. (Cl. 43—42.48)

The present invention relates to a unique distinctively designed fishing lure in the form of a peculiarly contoured hook-equipped plug.

In carrying out a preferred embodiment of the invention a plug is provided which is buoyant and is characterized by an egg-shaped body portion and a lateral extension or head portion, the latter being joined at its inner with the upper end portion of the body portion and being shaped to resemble a duck's bill, whereby a novel so-called decoy is had. It follows, therefore, that it is an object of the invention to provide a duck-like decoy or lure which offers the fisherman advantages not obtainable in similarly constructed and performing prior art lures. That is to say, the lure is so proportioned and shaped that it performs in countless ways in the water. If the water is exceedingly fast it rides forcefully in the current and seldom if ever sinks to and hits the bottom. If used for lake fishing, it has been shown to be exceptionally effective in attracting and catching trout in that it lends itself to smallness in size and may be consequently used to the utmost of satisfaction on a fly line due to the manner in which it drifts along and bobs and weaves in life-like fashion. With a breeze or ripple on the water, the user is assured of unusual activities from this type of a decoy with the result that fish are attracted thereto. In running water it is easy to feed out some two hundred feet of line and to nevertheless rely on the indeterminate but resultful maneuvers in the water.

Another object of the invention has to do with a decoy-like lure of the form and style herein disclosed which is further novel in that at least two fish hooks are provided, one dangling from the very bottom of the body portion at the center thereof and the other suspended and dangling from the bill-shaped head portion at the juncture thereof with the advance or front side of the body portion, making it possible to harness the hooks close together so as to insure greater catching ability and to also prevent the hooks from colliding with one another or tangling and also making it possible to use the device as a sinker.

Stated otherwise, the invention comprises a buoyant plug embodying a bulbous-shaped body portion provided at one end with a head portion projecting at an angle beyond one said surface of the body portion, said head portion having a transversely convex bottom surface and a convex top surface, a first fish hook attached to and suspended from the bottom surface of said body portion, and a second fish hook attached to and suspended from the bottom surface of the head portion and located in general alignment with the vertical front surface of said body portion, whereby said hooks are thus situated and hung at different levels, close to one another, and yet do not tangle or otherwise collide and interfere with each other.

Then, too, novelty is predicated on the structure above comprehended wherein the junctural portion between the head and body portions is reduced in cross-section to provide a sort of a neck, said head portion being approximately ovate in plan and therefore likened in shape and appearance to a duck's bill.

Objects, features and advantages in addition to those so far touched upon will become more readily apparent from the following description and the accompanying sheet of drawings.

In the drawings:

Figure 1 is a perspective view of a lure constructed in accordance with the principles of the present invention;

Figure 2 is a central longitudinal sectional view with portions appearing in elevation, the same being taken approximately on the plane of the line 2—2 of Figure 3, looking in the direction of the arrows;

Figure 3 is a top plan view of the same;

Figure 4 is an end elevation which may be conveniently referred to as a front end view.

The plug as a unit is denoted by the numeral 6. It can be made of commercial plastic or wood such as cedar, white pine, or aspen, wood being thought to insure satisfactory results. The lure is, of course, buoyant and functions, as before stated, as a floating decoy. In some respects the so-called decoy may be L-shaped in side elevation. It is therefore characterized by an egg-shaped or bulbous-shaped substantially vertical body portion 8 having all convex surfaces. The upper end of the body portion merges into a lateral extension which may be conveniently called the head portion and this is denoted generally by the numeral 10. As before stated it is preferably ovate and elongate in plan as best shown perhaps in Figure 3. It has a substantially transversely convex main bottom surface 12 and a transversely and longitudinally convex top surface 14 and it decreases in cross-section in a lengthwise direction as shown in Figure 2 so that it may be said to taper to a relatively thin rounded peak 16. The cross-section of the material is reduced at the junctural connection between the body 8 and the head portion 10 to form what may be conveniently referred to as a neck 18. In the upper convex surface inwardly of the peak is a substantially rectangular transversely disposed water trap or recess 20. This has an undercut or deepened portion 22 in the manner shown. A wire harness is embedded in the body and head portions and this comprises a length of wire one limb or end portion of which is denoted at 24. This has its terminal portion embedded as at 26. It extends down through the central portion of the body portion and is exposed where it forms into a return bend 28. This bend defines an eye for the fish hook 30 which is attached thereto by split-ring or the like 32. The upper end portion of the wire passes upwardly through the body portion and laterally and crosses over the stretch 24 as at 34. It is formed with a second bend 36 located at the angular juncture between the bottom 12 and the forward or front face 38 of the body portion. This provides a second eye for the second hook 40 which is also attached by way of a split-ring 42. The end portion 44 of the wire extending beyond the bend or eye 36 passes diagonally through the head portion 10 where it terminates in a fishing line eye 46, the latter being located in the deep longitudinal portion of the water trap pocket 20 as best shown in Figure 2. Here it is centrally located to accommodate a swivel 48 to which the fishing line 50 is conveniently connected for proper handling and control.

It will be noted that the pocket 20 extends transversely or crosswise in respect to the longitudinal dimension of the head portion and having its transverse ends situated inwardly of the marginal edges of the head portion and it is located in close spaced proximity in respect to the tip or beak 16. Practice has shown that the water flows into this so-called trap and aids in causing the lure to dart, dive and otherwise become forcefully active in position and ways imaginable but not easily herein described.

The best that can be said is that the action is fast, that the movements are in the bobbing and weaving category, that certain swirling maneuvers are attainable and it has been noticed that when the water is especially swift, the lure turns over on one side or the other while continuing to actively represent what is often mistaken for a real live bait. It has been noticed too that, under certain conditions and positions the lure, when the water is less rapid, resembles a crippled or disabled bug or insect. Since, however, the factors of uniqueness and distinctiveness are primarily structural in character no extended effort to either illustrate or describe motions and activities will be attempted here.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A fishing lure comprising a buoyant plug embodying a vertically usable bulbous-shaped body portion provided at its upper end with a head portion projecting at an angle beyond one side surface of the body portion, said head portion having a transversely convex bottom surface and a top surface which is both transversely and longitudinally convex, a first fish hook attached to and suspended from the bottom surface of the lower end of said body portion, and a second fish hook attached to and suspended from the bottom surface of the head portion adjacent to the vertical front surface of said body portion, whereby said hooks are thus situated and hung at different levels, and are relatively close to one another, the junction portion between the head and body portions being reduced in cross-section to provide a neck, said head portion being approximately ovate in plan and thus likened in shape and general appearance to a duck's bill, said top surface being provided with a recess arranged inwardly of the forward end of the head portion, said recess defining a pocket which is lengthened in a direction which is at an angle to the lengthwise axis of the head portion, said head portion being gradually decreased in thickness from its junctional connection with the body portion toward its free end, and a line attaching eye anchored in one wall of the pocket and confined in said pocket.

2. A fishing lure comprising a buoyant plug embodying a vertically usable bulbous-shaped body portion provided at its upper end with a head portion projecting at an angle beyond one side surface of the body portion, said head portion having a transversely convex bottom surface and a top surface which is both transversely and longitudinally convex, a first fish hook attached to and suspended from the bottom surface of the lower end of said body portion, and a second fish hook attached to and suspended from the bottom surface of the head portion adjacent to the vertical front surface of said body portion, whereby said hooks are thus situated and hung at different levels, and are relatively close to one another, the junctional portion between the head and body portions being reduced in cross-section to provide a neck, said head portion being approximately ovate in plan and thus likened in shape and general appearance to a duck's bill, said top surface being provided with a relatively shallow recess arranged rearwardly of the forward leading end of the head portion, and forwardly of the body portion, said recess being substantially rectangular in plan and having its transverse ends situated inwardly of the marginal edge portions of said head portion, said recess defining a pocket the bottom of which is partly flat but has an undercut portion thus defining stepped surfaces on varying and distinguishable levels, and a line attaching eye anchored on the rearward vertical wall of said recess midway between the transverse ends of the recess and confined within the depth of said pocket and situated directly above the undercut portion of the pocket.

References Cited in the file of this patent

UNITED STATES PATENTS

| | | |
|---|---|---|
| D. 166,809 | Klenk | May 20, 1952 |
| D. 169,826 | Schmidt | June 9, 1953 |
| 1,332,306 | Rush | Mar. 2, 1920 |
| 1,472,638 | Dickman | Oct. 30, 1923 |
| 1,492,228 | Smith | Apr. 29, 1924 |
| 1,616,485 | Carter | Feb. 8, 1927 |
| 2,241,767 | Cullerton | May 13, 1941 |
| 2,561,040 | Arbogast | July 17, 1951 |
| 2,603,902 | Stanwyck | July 22, 1952 |
| 2,684,551 | Hall | July 27, 1954 |